United States Patent [19]

Sasaki et al.

[11] Patent Number: 5,484,512
[45] Date of Patent: Jan. 16, 1996

[54] METHODS AND APPARATUSES FOR PRODUCING HIGH PURITY OXYGEN AND HYDROGEN

[75] Inventors: Takashi Sasaki, Hyogo; Hiroyuki Harada, Tokyo; Akihiko Hogetsu, Hyogo, all of Japan

[73] Assignees: Shinko Pantec Co., Ltd., Kobe; Mitsubishi Corporation, Tokyo, both of Japan

[21] Appl. No.: 247,670

[22] Filed: May 23, 1994

[51] Int. Cl.$^6$ .................................................. C25B 1/10
[52] U.S. Cl. .................... 204/129; 204/263; 204/232; 204/241; 210/900
[58] Field of Search ........................ 204/232, 129, 204/266, 263, 241; 210/660, 669, 681, 188, 900

[56] References Cited

U.S. PATENT DOCUMENTS

| | | | |
|---|---|---|---|
| 4,369,102 | 1/1983 | Galluzzo et al. | 204/262 |
| 4,950,371 | 8/1990 | McElroy | 204/253 |
| 5,037,518 | 8/1991 | Young et al. | 204/263 |
| 5,124,033 | 6/1992 | Ohmi et al. | 210/257.1 |

FOREIGN PATENT DOCUMENTS

| | | |
|---|---|---|
| 51-106683 | 9/1976 | Japan . |
| 57-134586 | 8/1982 | Japan . |
| 59-162284 | 9/1984 | Japan . |
| 62-13563 | 1/1987 | Japan . |
| 62-17184 | 1/1987 | Japan . |
| 1-247591 | 10/1989 | Japan . |
| 2-141566 | 5/1990 | Japan . |
| 2-179474 | 7/1990 | Japan . |
| 3-107488 | 5/1991 | Japan . |
| 4-9485 | 1/1992 | Japan . |
| 5-287570 | 11/1993 | Japan . |
| 6-151386 | 5/1994 | Japan . |

*Primary Examiner*—Kathryn Gorgos
*Attorney, Agent, or Firm*—Marshall, O'Toole, Gerstein, Murray & Borun

[57] ABSTRACT

An electrolytic solution prepared by dissolving an electrolyte such as KOH in pure water is fed into a membrane electrolytic cell of a membrane electrolyzer membrane electrolysis, made while the membrane electrolytic cell is provided intermittently or continuously with pure water. Oxygen generated at the anode and hydrogen generated at the cathode are purified individually by purifiers to produce oxygen and hydrogen of high purity. Also disclosed are methods of producing oxygen and hydrogen of high purity and their corresponding apparatuses in which a membrane degassing module is employed in conjunction with a solid polymer electrolyte electrolytic cell for effecting membrane electrolysis of the pure water, and in conjunction with a molecular sieve for individually dehumidifying oxygen generated at the anode and hydrogen at the cathode of the electrolytic cell.

5 Claims, 5 Drawing Sheets

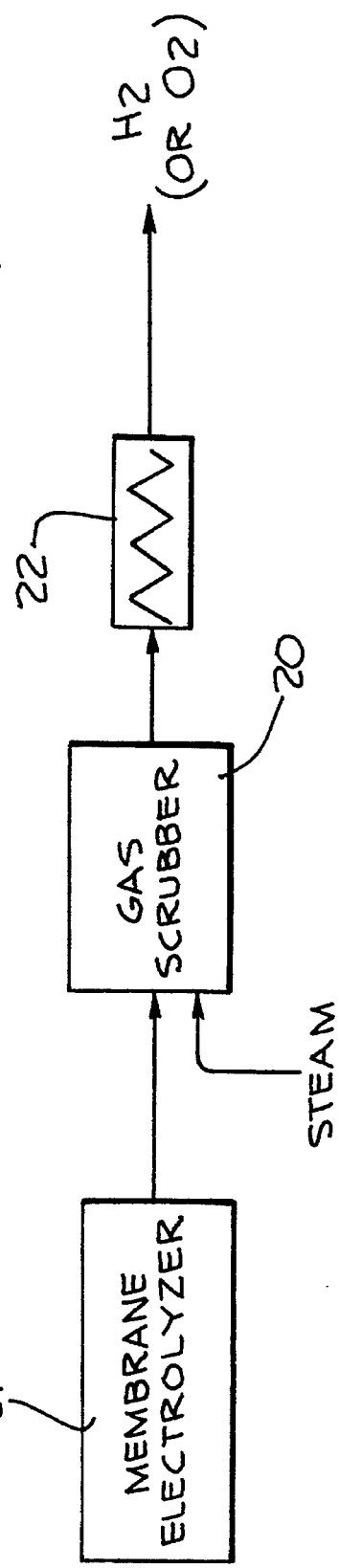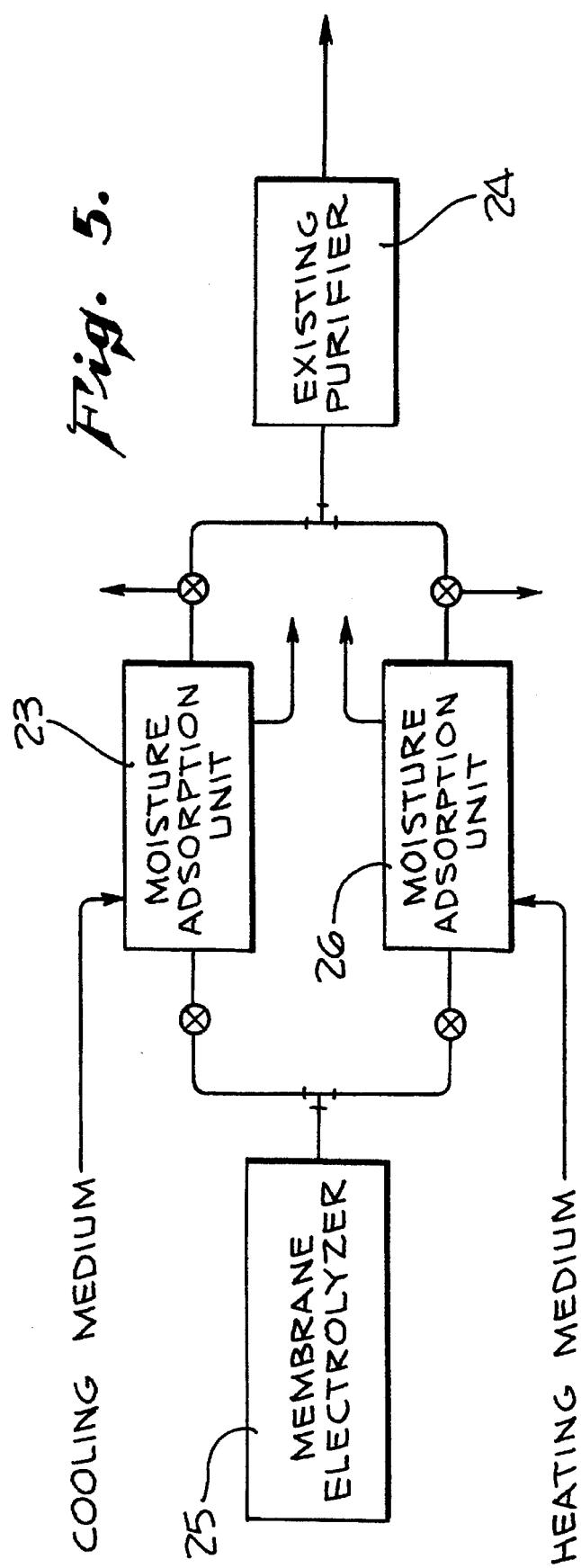

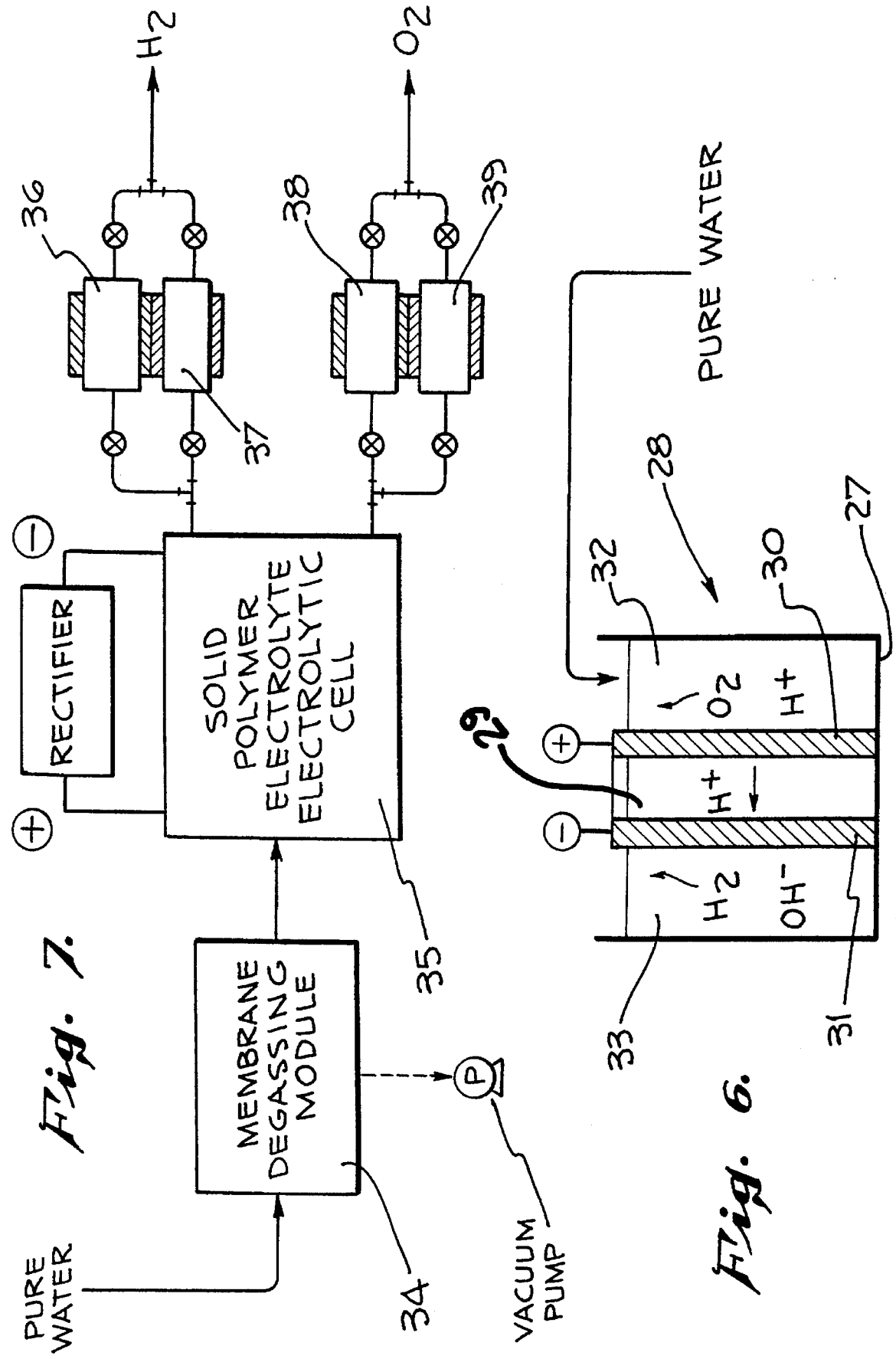

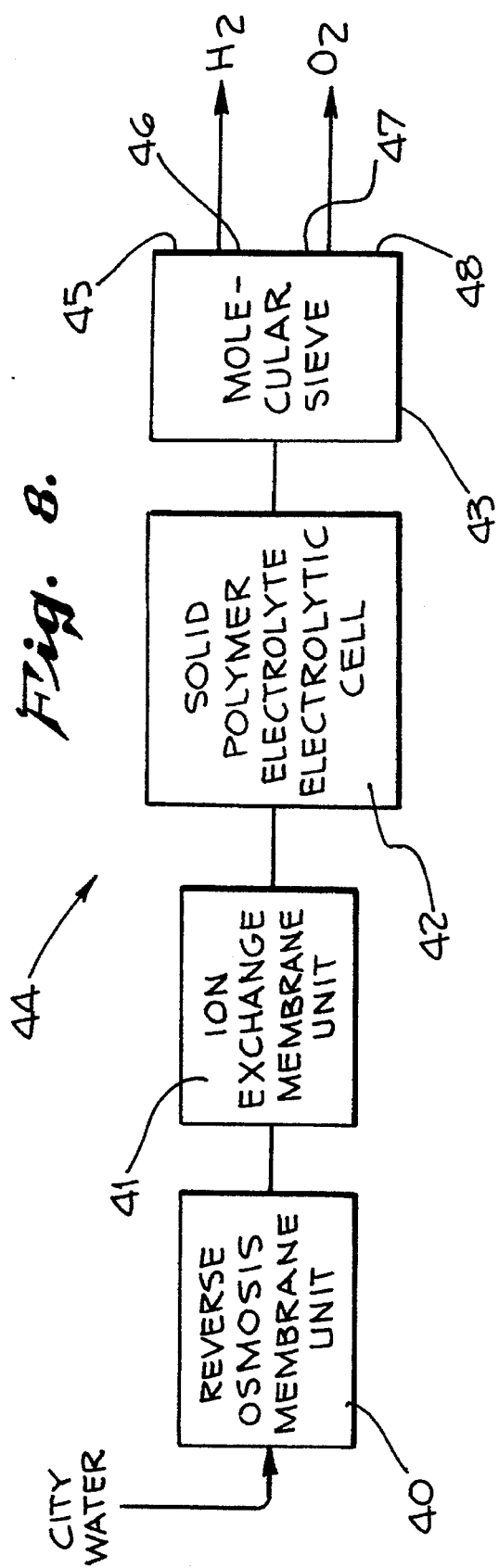
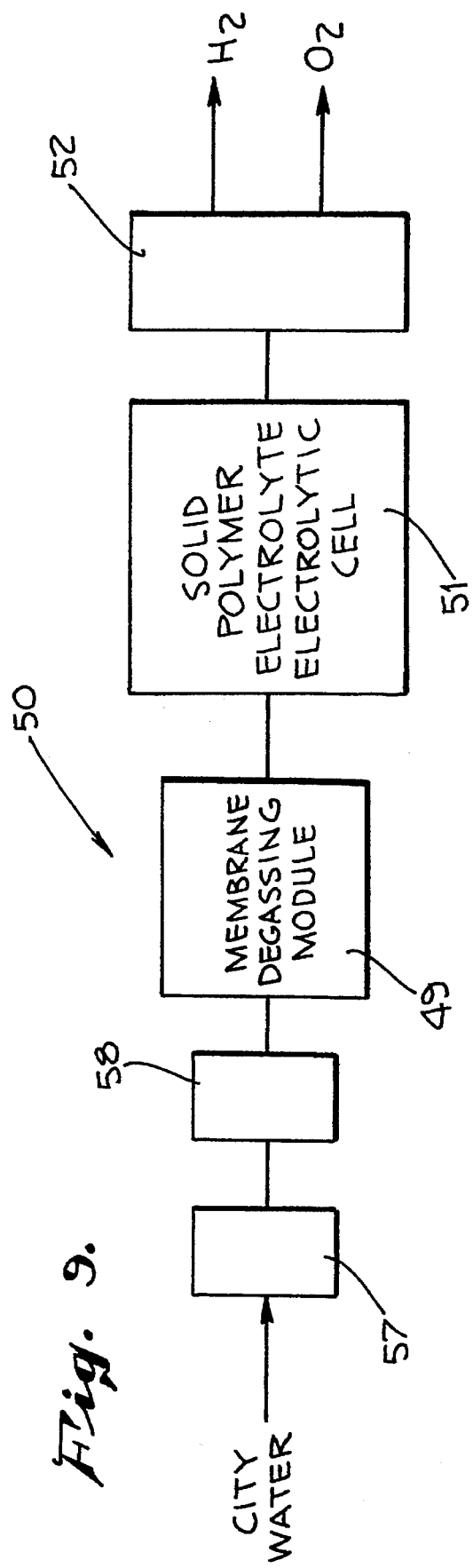

METHODS AND APPARATUSES FOR PRODUCING HIGH PURITY OXYGEN AND HYDROGEN

BACKGROUND OF THE INVENTION

1. Field of the Invention

The present invention relates generally to apparatuses for producing high purity oxygen and hydrogen. The present invention also relates generally to methods of producing high purity oxygen and hydrogen. More particularly, the present invention relates to methods and apparatuses for producing high purity oxygen and hydrogen by way of electrolysis of an electrolytic solution.

2. Description of Related Art

In the electronics industry, oxygen and hydrogen of high purity are used, for example, as atmospheric gases for thermal treatment. For instance, in the production process of semiconductors, oxygen of high purity is used as an atmospheric gas for the oxide film formation process, and hydrogen of high purity is used as the atmospheric gas for thermal treatment and for epitaxial growth. The purity of such oxygen and hydrogen impacts the quality of the product. Thus, high purity oxygen and hydrogen are needed in the electronics industry, particularly in the production of integrated circuits. Such gases are produced and provided as described below.

For hydrogen gas, excessive reproduction gas from electrolysis of common salt or from petroleum refinement is first purified by a purifier such as a fractionater, using a PSA (Pressure Swing Adsorption) purification method or a catalytic combustion purification method (primary purification), to obtain somewhat high purity hydrogen. This hydrogen is introduced into a bomb (cylinder), etc. at high pressure and delivered to users.

For oxygen gas, air is liquefied by the Joule-Thomson process, and components of the air are separated from each other by a cryogenic distillation process (low temperature processing), using the differences in their boiling points, to obtain somewhat high purity oxygen. The oxygen thus obtained is delivered in the form of liquefied oxygen to cold evaporators (oxygen gas generators or sources; hereinafter referred to just as "CE") of plants. Liquefied oxygen is vaporized when needed in the gas form.

The gases of oxygen and hydrogen provided by the above-mentioned production methods, however, have impurities such as nitrogen, carbon dioxide, carbon monoxide, hydrocarbons and water (hereinafter referred to as "impurities such as nitrogen"). Such impurities cannot be completely removed by the above-mentioned purifications. Hence, the above-mentioned oxygen and hydrogen must be further individually purified by purifiers at semiconductor plants to remove the impurities (the "secondary purification").

This further purification treatment (the secondary purification) needs to be done by an adsorption treatment with an adsorbent or by a sophisticated purification method such as a palladium membrane permeation process. It is difficult, however, to remove impurities such as nitrogen by the these purification treatment processes. Moreover, semiconductor elements of finer structure and higher strength require an ever-increasing purity of gases for their production, resulting in a requirement of purifiers and purification systems which are very complicated and expensive.

Moreover, oxygen stored in liquid form in CE and hydrogen introduced into and delivered in bombs at high pressure, pose many safety problems in case of emergency, such as earthquakes.

With regard to hydrogen, it is generally assumed that all impurities can be removed by a palladium membrane permeation method. This method, however, poses the problem that carbon contained in the palladium membrane reacts with hydrogen to produce hydrocarbons, which are themselves sources of impurities. Carbon impurities have adverse effects on the production of semiconductors, in particular, on electric properties of oxide films in the production of MOS devices. There is, therefore, a great need to eliminate carbon impurity from hydrogen.

In view of the above, there is a continuing need to develop methods and apparatuses for producing high purity oxygen and hydrogen.

SUMMARY OF THE INVENTION

One feature of the present invention involves a method of producing oxygen and hydrogen of high purity comprising the steps of (a) providing an electrolytic solution comprising an electrolyte dissolved in pure water; (b) feeding the electrolytic solution into a membrane electrolytic cell of a membrane electrolyzer; (c) electrolyzing the electrolytic solution while providing the membrane electrolytic cell intermittently or continuously with pure water; and (d) purifying individually by purifying means oxygen produced at the anode and hydrogen produced at the cathode.

Another feature of the present invention is an apparatus for producing oxygen and hydrogen of high purity, the apparatus comprising a membrane electrolyzer for effecting membrane electrolysis of an electrolytic solution prepared by dissolving an electrolyte in pure water; a pure water feeding means for continuously or intermittently feeding pure water to a membrane electrolytic cell of the membrane electrolyzer; and purifiers for purifying oxygen generated at the anode and hydrogen generated at the cathode of said membrane electrolyzer.

Another feature of the present invention involves a method of producing oxygen and hydrogen of high purity comprising the steps of (a) degassing pure water by a degassing means; (b) feeding the degassed water continuously or intermittently into a solid polymer electrolyte electrolytic cell; (c) effecting membrane electrolysis; and (d) dehumidifying individually by dehumidifying means the oxygen generated at the anode and hydrogen generated at the cathode.

Yet another feature of the present invention involves an apparatus for producing oxygen and hydrogen of high purity, the apparatus comprising a degassing means for degassing pure water; a solid polymer electrolyte electrolytic cell for effecting membrane electrolysis of degassed pure water degassed by the degassing means; a pure water feeding means for continuously or intermittently feeding pure water into the solid polymer electrolyte electrolytic cell; and a dehumidifying means for individually dehumidifying oxygen generated at the anode and hydrogen generated at the cathode of the solid polymer electrolyte electrolytic cell.

Yet another feature of the present invention involves an apparatus for producing oxygen and hydrogen of high purity comprising a pure water producing means for making pure water from raw water; a degassing means for degassing pure water produced by the pure water producing means; a solid polymer electrolyte electrolytic cell for effecting membrane electrolysis of the degassed pure water produced by the degassing means; a pure water feeding means for continuously or intermittently feeding pure water into the solid polymer electrolyte electrolytic cell; and a dehumidifying means for individually dehumidifying oxygen produced at the anode and hydrogen produced at the cathode of the solid polymer electrolyte electrolytic cell.

The above discussed and many other features and attendant advantages of the present invention will become apparent as the invention becomes better understood by reference to the following detailed description.

BRIEF DESCRIPTION OF THE DRAWINGS

FIG. 4 is a diagram schematically showing the third embodiment of the methods and apparatuses for producing high purity oxygen and hydrogen according to the present invention.

FIG. 5 is a diagram schematically showing the fourth embodiment of the methods and apparatuses for producing high purity oxygen and hydrogen according to the present invention.

FIG. 6 is a diagram showing an example of a solid polymer electrolyte electrolytic cell to be used in the methods and apparatuses for producing high purity oxygen and hydrogen according to the present invention.

FIG. 7 is a diagram schematically showing the fifth embodiment of the methods and apparatuses for producing high purity oxygen and hydrogen according to the present invention.

FIG. 8 is a diagram schematically showing the sixth embodiment of the methods and apparatuses for producing high purity oxygen and hydrogen according to the present invention.

FIG. 9 is a diagram schematically showing the seventh embodiment of the methods and apparatuses for producing high purity oxygen and hydrogen according to the present invention.

DETAILED DESCRIPTION OF THE PREFERRED EMBODIMENTS

Figure 1:
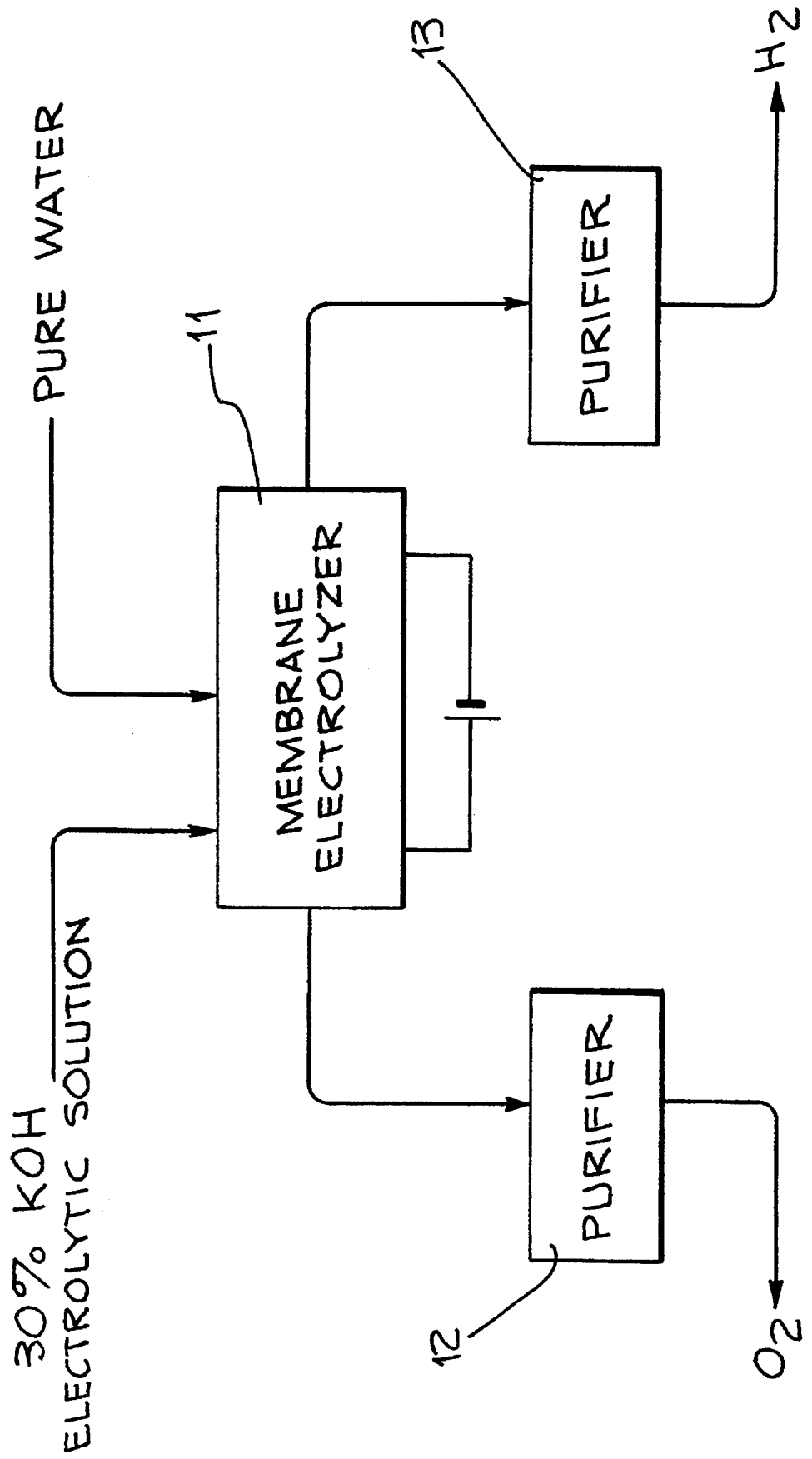
FIG. 1 is a diagram schematically showing the first embodiment of the methods and apparatuses for producing high purity oxygen and hydrogen of according to the present invention.

In methods and apparatuses for producing high purity oxygen and hydrogen according to the present invention, an electrolytic solution prepared by dissolving an electrolyte in pure water (i.e., deionized water) is fed into a membrane electrolytic cell of a membrane electrolyzer. Membrane electrolysis is made while said membrane electrolytic cell is provided intermittently or continuously with pure water, and oxygen generated at the anode and hydrogen generated at the cathode thereof are purified individually by purifiers to produce oxygen and hydrogen.

As pure water is subjected to membrane electrolysis, the gas generated at the anode is oxygen and the gas generated at the cathode is hydrogen. These gases can be introduced separately into their respective purifiers. For the gas generated at the anode (oxygen), the impurities which may be introduced into the purifier are only traces of hydrogen, the electrolyte composition and water. On the other hand, for the gas generated at the cathode (hydrogen), the impurities which may be introduced into the purifier are only traces of oxygen, the electrolyte composition and water. The kinds of impurities generated by electrolysis are thus very few, and impurities such as carbon dioxide, carbon monoxide, hydrocarbons and nitrogen are in principle not generated at all. The trace hydrogen in the oxygen gas and the trace oxygen in the hydrogen gas can be easily converted into water by means of an oxidation catalyst, then the water can be easily removed by a moisture adsorbent such as a molecular sieve. Further, electrolyte components can be easily removed with water.

The separate gases (oxygen and hydrogen) introduced into the respective purifiers are purified and refined. Since each of the separate gases to be introduced has a very limited kind of impurity as described above, a simple and inexpensive purifier or purifying system can purify the gas. As discussed above, the kinds of impurities contained in the gases to be introduced into a purifier are very few relative to those of the conventional method (nitrogen, carbon dioxide, carbon monoxide, hydrocarbons, moisture, etc.), sophisticated purifying methods such as a palladium membrane permeation method are, therefore, not required. The impurities can be removed easily by treatment with an oxidation catalyst or an adsorbent, or by cooling with liquefied nitrogen, etc. to purify the gas. Then, the gases can be purified to the desired level suitable for the electronics industry, including semiconductor production, by simple and inexpensive purifiers or purifying systems. Thus, high purity oxygen and hydrogen can be produced.

Moreover, since pure water is subjected to membrane electrolysis and the generated oxygen and hydrogen are separately purified by purifiers to produce oxygen and hydrogen, high purity oxygen and hydrogen can be produced whenever needed. There is no need for storage in bombs, CE, etc. Furthermore, oxygen and hydrogen generation can be terminated instantly by simply turning off the power supply, contributing to enhanced safety. This is another benefit to producing high purity oxygen and hydrogen simultaneously.

Hence, according to methods and apparatuses for producing high purity oxygen and hydrogen of the present invention, there is no need to eliminate impurities such as nitrogen, which was difficult in the past. Oxygen and hydrogen can be purified by simple purification treatments to the desired levels suitable to the production of semiconductors. Further, the methods and apparatuses of producing high purity oxygen and hydrogen according to the present invention are conducive to enhanced safety. Oxygen and hydrogen of high purity can be produced whenever they are required, and there is no need of storing them in bombs, CE, etc. Moreover, the generation of oxygen and hydrogen can be terminated instantaneously by turning off the power supply.

For the above-mentioned electrolysis, nickel is preferably used for the electrodes (both the anode and the cathode).

For the above-mentioned electrolyte, it is preferable to use electrolytes, such as KOH, NaOH and $Na_2SO_4$, which do not produce gases other than $H_2$ and $O_2$. This, in turn, improves the current efficiency during the membrane electrolysis, and makes it hard for the electrodes to elute and for any substances to precipitate on the electrodes.

For the above-mentioned pure water, it is preferable to use pure water of which the specific resistance is 18.25 MΩ cm (25° C.) or over. This further reduces the kinds and quantities of impurities, such as nitrogen, contained in the gases generated by the membrane electrolysis, to be introduced into the purifiers. This, in turn, allows purification with simple and inexpensive purifiers and purifying systems. Such pure water is preferably obtained by ion exchange and membrane separation treatments. Such pure water facilities are expensive facilities, but they are always provided in the present advanced semiconductor plants. Although it depends on the uses to which the hydrogen and oxygen are to be put, existing pure water facilities can generally be used under normal conditions.

For a membrane of the above-mentioned membrane electrolyzer, a conventional asbestos membrane, or other membranes such as an ion-exchange membrane, an inorganic porous membrane and an organic porous membrane are preferable. It is most preferred to use an ion-exchange membrane. The reason being that the applicable current density for a conventional asbestos membrane is up to 25 $A/dm^2$ whereas that for an ion-exchange membrane may be set higher at from 40 to 50 $A/dm^2$. This, in turn, will reduce the quantity of impurities contained in the gasses generated by the membrane electrolysis. Moreover, the membrane electrolyzer may be made more compact and the electrolyzing block may be made into a module.

For the above-mentioned purifiers, simple and inexpensive purifiers will do as explained above. For instance, purifiers having a purifying mechanism based on a cooling method may be used.

For the materials for the piping going from the membrane electrolyzer to the purifiers and the vessels of the purifiers, it is preferable to use stainless steel which has been electropolished, then heated in an oxidizing atmosphere to form a colored oxide film, or stainless steel which has been electropolished, then heated, and then treated by pickling and washing to meld and remove the colored oxide film (Japanese Patent Provisional Publication No. SHO-6213563, Japanese Patent Publication No. HEI-2-1916, and Japanese Patent Provisional Publication No. HEI-2-141566). This will result in a higher resistance to KOH, less adsorption of water, less particle formation, and elimination of contamination. Hence high purity oxygen and hydrogen can be produced more easily and more reliably.

FIG. 1 is a schematic diagram showing the first embodiment of the methods and apparatuses for producing high purity oxygen and hydrogen according to the present invention.

The electrolyte was KOH of which impurities were of the ppb order (A1:17 ppb; Zn: 10 ppb; As: 3 ppb; Cu: 1.8 ppb; Pb: 0.9 ppb; Cd: 0.1 ppb; etc.) The pure water had TOC (total organic carbon) <1.0 ppb, specific resistance of 18.25MΩ-cm; particle quantity <1.0 n/ml, silica <1.0 ppb, and residue on evaporation <1.0 ppb. KOH was dissolved in the pure water to prepare a 30% KOH aqueous solution and the solution was used as the electrolytic solution.

The above-mentioned 30% KOH aqueous solution (electrolytic solution) was fed into a membrane cell of a membrane electrolyzer (11), and membrane electrolysis was performed while the pure water was fed continuously into the membrane electrolytic cell. Oxygen generated at the anode was introduced into a purifier (12) to purify the oxygen. On the other hand, hydrogen generated at the cathode was introduced into a purifier (13) to purify the hydrogen. Thus, high purity oxygen and hydrogen were generated.

In the operation, the membrane of the membrane electrolyzer (11) was an ion-exchange membrane {cation-exchange membrane (fluorocarbon resin sulfonic acid cation exchange membrane)}, and the effective membrane area was 250 $cm^2$. The current density of the membrane electrolysis was 50A/ $dm^2$, and the cell voltage was 2.1 V. The purifiers (12) and (13) were of a system using liquefied nitrogen cooling. The cooling temperature was −180° C. The production rate of oxygen of high purity was 25 Nl/hr, 3 bar, and that of hydrogen of high purity was 50 Nl/hr, 3 bar.

The purity of the generated high purity oxygen was 99.999% or over and the purity of the generated high purity hydrogen was 99.999% or over. Their purities were comparable to or superior to those of oxygen and hydrogen obtainable by the secondary purification process employed in conventional semiconductor plants.

Figure 2:
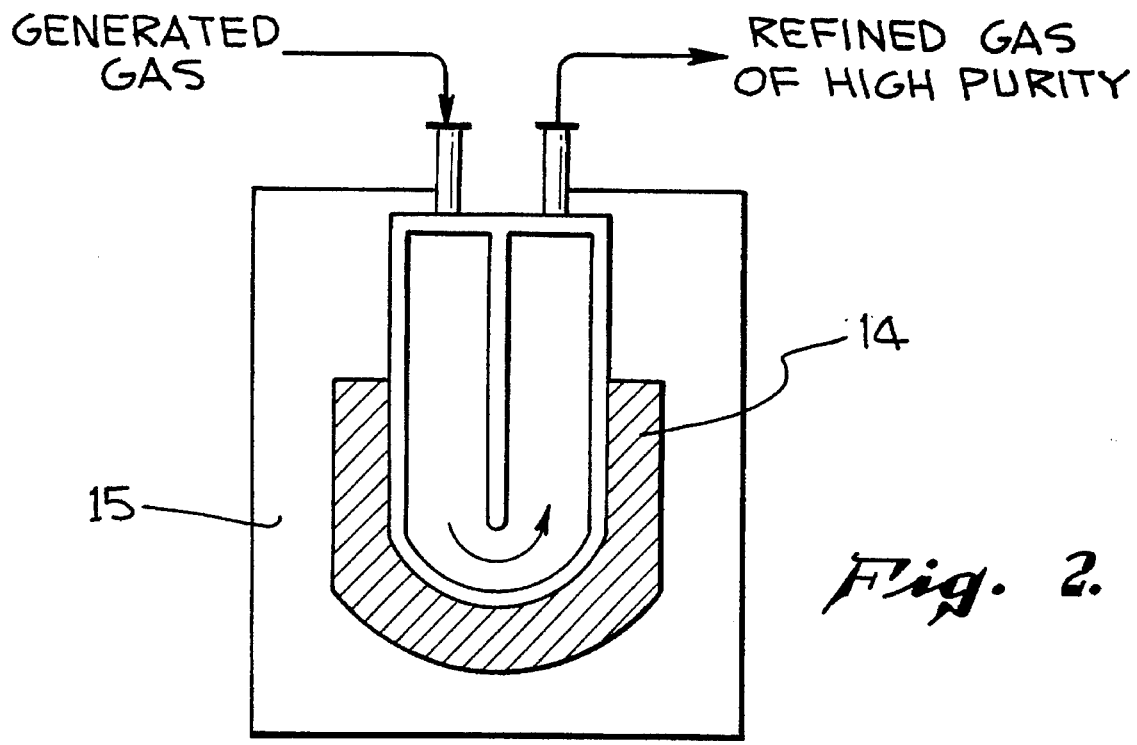
FIG. 2 is a diagram showing an example of a purifier to be used by the methods and apparatuses for producing high purity oxygen and hydrogen according to the present invention.

For the above-mentioned purifiers (12) and (13), a purifier which is a cooling system (shown in FIG. 2) may be used. The bottom of the vessel of this purifier is cooled with liquefied nitrogen (−180° C.) or the like (14), and the purifier can aggregate and remove impurities, KOH and moisture. For the material of the purifier, it is desirable to use stainless steel which has been electropolished, then heated in an oxidizing atmosphere to form a colored oxide film over the surface, or stainless steel which has been electropolished, heated to form the film, then pickled and washed to dissolve and remove the colored oxide film. Both stainless steels have good corrosion resistance against KOH, hardly adsorb moisture, and produce less particles.

Figure 3:
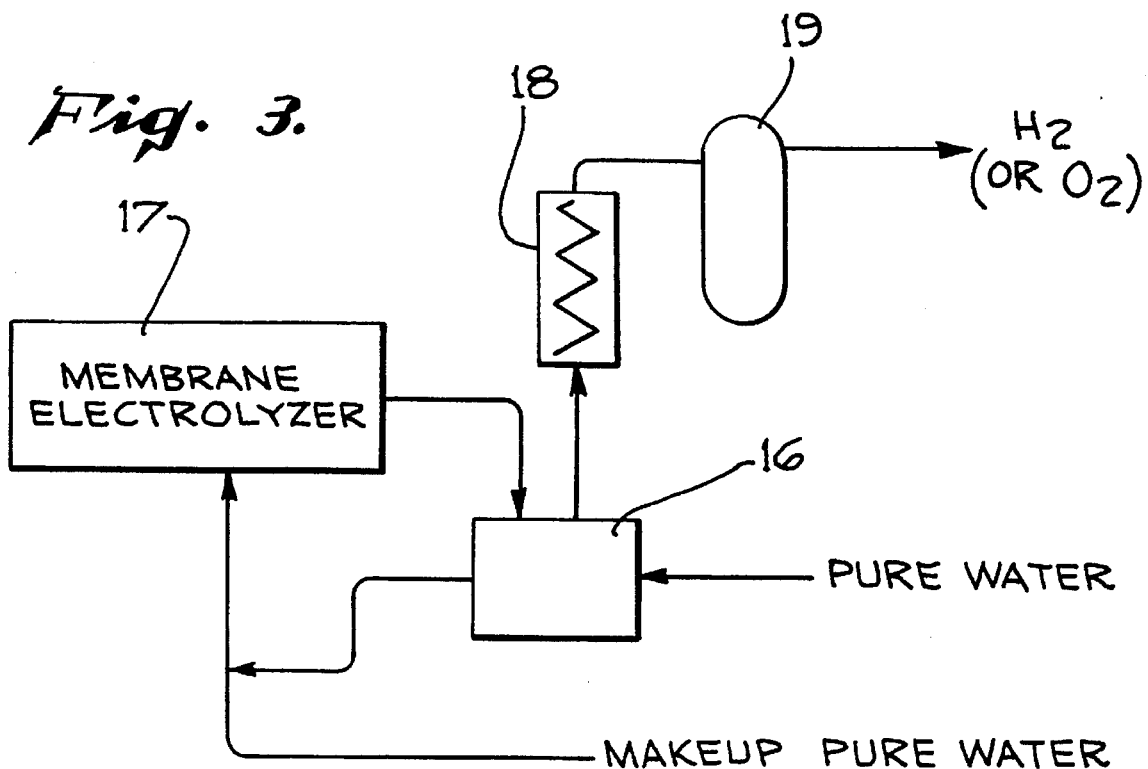
FIG. 3 is a diagram schematically showing the second embodiment of the methods and apparatuses for producing high purity oxygen and hydrogen according to the present invention.

FIG. 3 is a schematic diagram showing the second embodiment of the methods and apparatuses for producing high purity oxygen and hydrogen to the present invention.

As shown in FIG. 3, a gas scrubber (16) (impinger type scrubber (gas-liquid contact system)) is provided between a membrane electrolyzer (17) and a purifier (18) comprising a cooler, etc. The gases generated by membrane electrolysis are scrubbed in the gas scrubber (16), then fed into the purifier (18). The KOH entrained by the gas during the membrane electrolysis is scrubbed in the gas scrubber (16), then fed into the purifier (18). The KOH entrained by the gas during the membrane electrolysis is removed by the gas scrubber (16). Hence the purifier (18) may be a simpler one, or the purity of the gas may be improved. If KOH removed by the gas scrubber (16) is arranged to be introduced together with the scrubbing water (pure water) into the membrane electrolyzer (17), KOH can be recycled.

FIG. 4 is a schematic diagram showing the third embodiment of the methods and apparatuses for producing high purity oxygen and hydrogen according to the present invention.

As shown in FIG. 4, a gas scrubber (20), which scrubs gas with steam, is provided between a membrane electrolyzer (21) and a purifier (22). In the steam scrubbing, the steam contacts the generated gas of low temperature to coagulate and turn it into a mist. Water particles of the mist provide nuclei for capturing the KOH spray and many nuclei in which KOH is coagulated are produced. As a result, the purification by the purifier (22) can be made much more easily.

FIG. 5 is a schematic diagram showing the fourth embodiment of the methods and apparatuses for producing high purity oxygen and hydrogen according to the present invention.

FIG. 5 shows an embodiment for when a semiconductor plant already has a purifier. As shown in FIG. 5, moisture adsorption units (23) and (26), which have a simple structure, such as a molecular sieve (molecular sieves having pore diameter of 4 Å ($Na_{12}[(AlO_2)_{12}(SiO_2)_{12}]\cdot 27H_2O$) are provided between an existing purifier (24) and a membrane electrolyzer (25). The moisture adsorption units (23, 26) take away excessive moisture from the generated gas. Other impurities are removed by the existing purifier (24). By installing just the membrane electrolyzer (25) and moisture adsorption units (two units), oxygen and hydrogen of purities comparable to those of conventional oxygen and hydrogen can be obtained. The two moisture adsorption units of FIG. 5 are used alternatively. One unit is cooled to adsorb moisture, while the other unit is heated to evaporate and release the moisture adsorbed. When the evaporation and release are completed, the unit is made to stand by for the next operation of moisture adsorption.

The above-mentioned method of producing oxygen and hydrogen of high purity and its apparatus can produce, by membrane electrolysis, oxygen and hydrogen free of certain impurities such as nitrogen. It is, therefore, not necessary to remove certain impurities such as nitrogen, which was difficult in the past. A relatively simple method of purification is sufficient to attain the required purity, i.e., that obtained with a secondary purification process. Since high purity oxygen and hydrogen can be produced just when needed, there is no need of storage in tanks, bombs, etc., thus, improving safety.

Traces of hydrogen, electrolyte components and moisture, however, are contained in the oxygen gas generated at the anode as impurities after the membrane electrolysis, and traces of oxygen, electrolyte components and moisture are contained in the hydrogen gas generated at the cathode. These impurities must be removed. The moisture and electrolyte component can be removed by a moisture adsorbent such as a molecular sieve. The trace hydrogen in the oxygen and the trace oxygen in the hydrogen, however, must be turned into moisture first by means of an oxidation catalyst, etc. before removal by a moisture adsorbent. In addition to cross-contamination of the generated oxygen and hydrogen and contamination with electrolyte components, impurities such as nitrogen may also contaminate the generated oxygen and hydrogen. The source of impurities such as nitrogen are gasses dissolved in the pure water. The presence of impurities such as nitrogen in the generated hydrogen and oxygen require further and more complicated purification procedures.

It is, therefore, desirable to further reduce the kinds and quantities of impurities in the generated oxygen and hydrogen.

Further provided in accordance with the present invention are methods and apparatuses for producing high purity oxygen and hydrogen which employ a degassing means for degassing gases from pure water, a solid polymer electrolyte electrolytic cell for effecting membrane electrolysis of pure water degassed by the degassing means, and dehumidifying means for separately dehumidifying oxygen generated at the anode and hydrogen generated at the cathode of the water electrolytic cell.

Pure water, introduced into the apparatus, is first degassed by a degassing means to remove $N_2$ and $O_2$ gasses dissolved in the pure water. Next, the pure water is introduced into the solid polymer electrolyte electrolytic cell and subjected to membrane electrolysis. Oxygen is generated at the anode, and hydrogen is generated at the cathode. Oxygen and hydrogen so generated contain no impurities except traces of water. Oxygen and hydrogen purities are thus very high. Further, since the pure water to be introduced into the above-mentioned cell is degassed in advance, dissolved gasses such as $N_2$ are not allowed to enter the generated gases.

The solid polymer electrolyte electrolytic cell is shown in FIG. 6. In a cell proper (27) of a solid polymer electrolyte electrolytic cell (28), there is located a porous solid polymer electrolyte (29), for instance, a cation exchange membrane (fluorocarbon resin sulfonic acid cation exchange membrane, e.g., "NAFION® 117" of DuPont, which are fabricated from copolymers of tetrafluoroethylene and perfluorinated monomers containing sulfonic or carboxylic acid groups) is preferred. A porous anode (30) and a porous cathode (31) both preferably being made of platinum group metal are joined to both sides of the solid electrolyte (29). The cell proper (27) is divided by the solid polymer electrolyte (29) into two electrolytic cells (32) and (33); the anode electrolytic cell (32) and the cathode electrolytic cell (33). While a voltage is applied across the anode (30) and the cathode (31), pure water is introduced into the anode side to make electrolysis. Oxygen is generated at the anode (30) and hydrogen is generated at the cathode without being mixed with each other. As the electrolyte is a solid polymer electrolyte comprising a cation exchange membrane (29), the ionic conduction in the electrolyte is made by the transfer of $H^+$ being generated by an electrochemical reaction at the anode, and any electrolytes such as KOH are not used. Accordingly, the oxygen being the gas generated at the anode contains a trace of water, but it does not contain hydrogen, electrolyte components, nor dissolved gases. The hydrogen being the gas generated at the cathode contains a trace of water, but it does not contain oxygen, electrolyte components, nor dissolved gases.

To be more specific, pure water is introduced from a pure water supply system (not illustrated) into the anode electrolytic cell (32) of the solid polymer electrolyte electrolytic cell (28). The pure water is decomposed by the reactions:

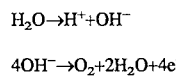

at the anode (30) to produce oxygen gas. The $H^+$ ions generated at the same time permeate through the solid electrolyte (29) to produce hydrogen gas, of which volume is twice that of the oxygen gas, at the cathode (28) by the reaction

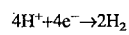

As explained above, the oxygen being the gas generated at the anode and the hydrogen generated at the cathode after the membrane electrolysis do not contain impurities except a trace of water. Hence, simple dehumidification of such generated gases with the above-mentioned dehumidifying means is sufficient to obtain high purity oxygen and hydrogen required in technical fields including the electronics industry. This method of producing oxygen and hydrogen of high purity generates less kinds of impurities to be purified relative to the above-mentioned methods and apparatuses of the present invention, and allows further simplification of the purification processes.

For the above-mentioned pure water, it is preferable to use pure water of which purity is, in terms of specific resistance, 18.25MΩ·cm (25° C.) or over. This assures that the impurity in the gases generated after membrane electrolysis is just traces of water. Thus, high purity oxygen and hydrogen can be obtained. Such a pure water can be obtained by ion exchange and membrane separation. A pure water facility of this kind is expensive, but the advanced semiconductor plants of the present day are always provided with such a facility. The existing pure water facility is normally adequate for the supply of pure water, although it depends on the usages to which the hydrogen and oxygen are to be put.

For the above-mentioned degassing means, it is preferable to use a membrane degassing module (membrane type air drier using water vapor permeable membrane (fluorocarbon resin (PTFE) hollow fiber membrane), SUNSEP-W Module (Asahi Glass Co. Ltd.)). The reason is that it is simple, of a continuous type, and compact.

An apparatus for producing high purity oxygen and hydrogen according to the present invention is provided with a pure water producing means for making water into pure water, a solid polymer electrolyte electrolytic cell for membrane electrolysis of the pure water produced by the pure water producing means, and dehumidifying means for separately dehumidifying the oxygen generated at the anode and the hydrogen generated at the cathode of said electrolytic cell. Water such as city water, etc. is introduced into the pure water manufacturing means of this apparatus to produce pure water. Then, the pure water is introduced into the solid polymer electrolyte electrolytic cell membrane electrolysis is performed. Next, the oxygen and the hydrogen generated by this electrolysis are dehumidified by the dehumidifying means to obtain oxygen and hydrogen of high purity. As degassing is not done prior to the membrane electrolysis, the oxygen and hydrogen obtained have lower purities relative to those of the oxygen and hydrogen obtained by the above-mentioned method and apparatus, but are applicable to certain applications, fairly meeting the required purities. For instance, the hydrogen is fairly good for hydrogen energy applications. When higher purities are needed, it is sufficient to add a means for degassing the pure water obtained from the pure water producing means; the membrane electrolysis is made after degassing by the degassing means.

For the above-mentioned pure water producing means, there is no specially limiting requirement. An apparatus comprising a reverse osmosis unit and an ion-exchange resin unit, both connected with piping, are preferably used. For example, a simple pure water unit for a laboratory, wherein a reverse osmosis membrane and an ion-exchange resin or an ion-exchange membrane are used as a set, are preferably used. When a large sized apparatus is needed, an apparatus comprising a primary pure water unit having a reverse osmosis membrane and a secondary pure water unit having an ion-exchange resin and an ultra filtration (UF) membrane as a set is preferred. In this case, for the reverse osmosis membrane, cellulose acetate membrane is preferred, and for the ion-exchange resin, a mix bed ion-exchange column using an ion-exchange resin and a cation exchange resin in mixture is preferred. With this arrangement, organic matters and salts are efficiently removed.

FIG. 7 is a schematic diagram showing the fifth embodiment of the methods and apparatuses producing high purity oxygen and hydrogen according to the present invention.

For the major components, the apparatus uses, as a degassing means, a membrane degassing module (34) (membrane type air drier using water vapor permeable membrane (fluorocarbon resin of polytetrafluoroethylene (PTFE) hollow fiber membrane), SUNSEP-W Module (Asahi Glass Co. Ltd.)) to which a solid polymer electrolyte electrolytic cell (35) (the same apparatus as that of FIG. 6) is connected with piping. Molecular sieves (36), (37), (38) and (39) (the same as the molecular sieves of FIG. 5 are connected to the cell (35) with piping as the dehumidifying means.

Pure water was continuously introduced into the above-mentioned apparatus to produce oxygen and hydrogen of high purity. The pure water had TOC (total organic carbon) <1.0 ppb, specific resistance of 18.25 M$\Omega$·cm, particle quantity<1.0 n/ml, silica<1.0 ppb, and residue on evaporation<1.0 ppb. Said pure water was degassed by the membrane degassing module (34), then subjected to membrane electrolysis by the solid polymer electrolyte water electrolytic cell (35). Oxygen was generated at the anode and hydrogen was generated at the cathode. The oxygen and the hydrogen were separately introduced into (36) or (37), and (38) or (39) to be dehumidified. As a result, oxygen of high purity at 99.999% or over and hydrogen of high purity at 99.999% or over were obtained. Their purities are comparable to or higher than those of highly-pure oxygen and hydrogen obtained by the purification processes (secondary purification) in the conventional semiconductor plants. The details of the production conditions were as follows:

Degassing condition: Inlet pure water pressure at 3.0 kg/cm$^2$;

inflow pure water rate at 1 l/min.

Voltage: 5 V.

Current: 300 A.

Dehumidifying conditions:

Inlet gas temperature at 30° C.;

Outlet gas dew point at −70° C.; and

Regeneration temperature at 300° C.

FIG. 8 is a schematic diagram showing the sixth embodiment of the methods and apparatuses for producing high purity oxygen and hydrogen according to the present invention.

For the major components, the apparatus uses, as a pure water producing means, a pure water producing means (44) comprising a reverse osmosis membrane unit (40) (the same as that of FIG. 7) and an ion exchange resin unit (41) (the same as that of FIG. 7) both being connected with piping. A solid polymer electrolyte electrolytic cell (42) (the same as that of FIG. 7) was connected to the pure water producing means (44) with piping. Molecular sieves (43) (the same as those of FIG. 7; comprising (45), (46), (47) and (48) just like the fifth embodiment above) were connected to said electrolytic cell (42) with piping.

City water was continuously introduced into the above-mentioned apparatus to produce oxygen and hydrogen of high purity. The city water was turned into pure water by the pure water producing means (44). The pure water was subjected to membrane electrolysis by said electrolytic cell (42). Oxygen was generated at the anode and hydrogen was generated at the cathode. The oxygen and the hydrogen were separately introduced into the molecular sieves (43) to be dehumidified. As a result, oxygen of high purity at 99.999% or over and hydrogen of high purity at 99.999% or over were obtained. The details of the production conditions were as follows:

City water inflow rate: 12 ml/min (added water).

Pure water production rate: 3 l/min.

Voltage: 4 V.

Current: 1200 A.

Dehumidifying conditions:

Inlet gas temperature at 35° C.;

Outlet gas dew point at −70° C.; and

Regeneration temperature at 300° C.

FIG. 9 is a schematic diagram showing the seventh embodiment of the methods and apparatuses for producing high purity oxygen and hydrogen according to the present invention.

The apparatuses are identical to those of the sixth embodiment except a membrane degassing module (49) of the fifth embodiment is connected, with piping, between a pure water producing means (50) and a solid polymer electrolyte electrolytic cell (51) of the apparatus of the sixth embodiment.

City water was continuously introduced into the above-mentioned apparatus to produce oxygen and hydrogen of high purity. The city water was turned into pure water by the pure water producing means (50). The pure water was degassed by the membrane degassing module (49) and subjected to membrane electrolysis by said electrolytic cell (51). Oxygen was generated at the anode and hydrogen was generated at the cathode. The oxygen and the hydrogen were separately fed into the molecular sieves (52) to be dehumidified. As a result, oxygen of high purity at 99.999% or over and hydrogen of high purity at 99.999% or over were obtained. Their purities are comparable to those of highly-pure oxygen and hydrogen obtained by the secondary purification in the conventional semiconductor plants. The details of the production conditions were as follows:

City water inflow rate: 12 ml/min. (added water)
Pure water production rate: 3 l/min.
Degassing conditions:
Inlet pure water pressure at 3.0 kg/cm$^2$;
Inflow pure water rate at 3 l/min.
Voltage: 4 V.
Current: 1200 A.
Dehumidifying conditions:
Inlet gas temperature at 35° C.;
Outlet gas dew point at −70° C.; and
Regeneration temperature at 300° C.

As explained above, the methods and apparatuses producing oxygen and hydrogen according to the present invention subject pure water to membrane electrolysis and separately purify, by means of purifiers, the oxygen and the hydrogen generated to produce oxygen and hydrogen of high purity. Hence the methods and the apparatuses allow the use, for purification, of a simple and inexpensive purifier or purification system such as one based on a purification system of cooling with liquefied nitrogen rather than sophisticated purification methods such as the palladium membrane permeation method. Furthermore, the methods and the apparatuses have an effect that they can produce oxygen and hydrogen of high purity whenever needed for use, eliminating the need of storage in bombs, tanks, etc., thus enhancing safety.

The apparatuses for producing oxygen and hydrogen of high purity according to the present invention degas, when necessary, pure water by means of the degassing means to remove $N_2$, $O_2$ gases, etc. dissolved in the pure water before membrane electrolysis in a solid polymer electrolyte electrolytic cell. Hence the apparatuses produce highly-pure oxygen and hydrogen both containing no impurities except traces of water. High purity oxygen and hydrogen needed for technical fields such as the electronics industry can be obtained by merely dehumidifying, by means of dehumidifying means, the produced oxygen and hydrogen. There are no impurities such as nitrogen, which were difficult in the past. The purification treatment can be made extremely simply relative to the conventional methods, and as the kinds of impurities to be purified are very few, the purification treatment is much simpler.

Having thus described exemplary embodiments of the present invention, it should be noted by those of skill in the art that the within disclosures are exemplary only and that various other alternatives, adaptations and modifications may be made within the scope of the present invention. Accordingly, the present invention is not limited to the specific embodiments as illustrated herein, but is only limited to the following claims and their equivalents.

What is claimed is:

1. A method of producing high purity oxygen and hydrogen comprising the steps of:
   (a) degassing a gas in pure water by using a membrane degassing module including an air drier using a fluorocarbon resin hollow fiber membrane;
   (b) providing an electrolytic solution comprising an electrolyte dissolved in only the degassed pure water wherein said electrolyte is selected from the group consisting of KOH, NaOH and $Ha_2SO_4$; then
   (c) feeding the electrolytic solution into a membrane electrolytic cell of a membrane electrolyzer including a membrane, an anode and a cathode;
   (d) electrolyzing the electrolytic solution while providing the membrane electrolytic cell intermittently or continuously with degassed pure water to produce oxygen at the anode and hydrogen at the cathode, wherein said oxygen and said hydrogen have entrained electrolyte components;
   (e) removing said electrolyte components by scrubbing said oxygen and hydrogen in a gas scrubber with pure water or steam; and
   (f) purifying individually by purifying means oxygen produced at the anode and hydrogen produced at the cathode by a cooling type purifier.

2. An apparatus for producing oxygen and hydrogen of high purity, said apparatus comprising;
   a membrane degassing module including an air drier using a fluorocarbon resin hollow fiber membrane for degassing a gas in pure water to provide degassed pure water;
   a membrane electrolyzer directly and operatively connected downstream to the membrane degassing module, and including a membrane, an anode and a cathode for effecting membrane electrolysis of an electrolytic solution prepared by dissolving an electrolyte in the degassed pure water, wherein said electrolyte is selected from the group consisting of KOH, NaOH and $Na_2SO_4$;
   a pure water feeding means fed directly into the degassing module for continuously or intermittently feeding degassed pure water to a membrane electrolytic cell of the membrane electrolyzer; and
   purifiers for individually purifying oxygen generated at the anode and hydrogen generated at the cathode of said membrane electrolyzer being connected to a cooling purifier through a gas scrubber wherein the electrolyte entrained by the oxygen and hydrogen during the membrane electrolysis and contained in the oxygen and hydrogen generated by the membrane electrolysis is scrubbed by pure water or steam.

3. A method of producing oxygen and hydrogen of high purity comprising the steps of:
   (a) degassing a gas in pure water using a membrane degassing module including an air drier using a fluorocarbon resin hollow fiber membrane to provide degassed water;
   (b) feeding only the degassed water continuously or intermittently into a solid polymer electrolyte electrolytic cell having an unporous solid polymer electrolyte electrolytic membrane made of a cation exchange membrane wherein a platinum group metal is joined to opposite sides of the solid polymer electrolyte membrane to form an anode and a cathode;
   (c) effecting membrane electrolysis; and (d) dehumidifying individually by dehumidifying means the oxygen generated at the anode and hydrogen generated at the cathode, wherein the dehumidifying means includes a plurality of molecular sieves connected in parallel.

4. An apparatus for producing oxygen and hydrogen of high purity, the apparatus comprising;

a membrane degassing module including an air drier using a fluorocarbon resin hollow fiber membrane to degas pure water;

a solid polymer electrolyte electrolytic cell directly connected downstream of the degassing module for effecting membrane electrolysis of degassed pure water degassed by the membrane degassing module, wherein said solid polymer electrolyte electrolytic cell has an unporous solid polymer electrolyte electrolytic membrane made of a cation exchange membrane, and wherein a platinum group metal is joined to opposite sides of the solid polymer electrolyte membrane to form an anode and a cathode;

a pure water feeding means directly fed into the degassing module for continuously or intermittently feeding degassed pure water into the solid polymer electrolyte electrolytic cell of said membrane electrolyzer; and a dehumidifying means for individually humidifying oxygen generated at the anode and hydrogen generated at the cathode of the solid polymer electrolyte electrolytic cell by a dehumidifier having a plurality of molecular sieves connected in parallel.

5. An apparatus for producing oxygen and hydrogen of high purity comprising;

a pure water producing means for making pure water from raw water wherein the pure water producing means includes an interconnected reverse osmosis membrane unit and ion-exchange membrane unit;

a membrane degassing module including an air drier using a fluorocarbon resin hollow fiber membrane for degassing pure water produced by the pure water producing means;

a solid polymer electrolyte electrolytic cell directly connected downstream of the degassing module for effecting membrane electrolysis of the degassed pure water produced by the membrane degassing module, said solid polymer electrolyte electrolytic membrane made of a cation exchange membrane, wherein a platinum group metal is joined to opposite sides of the solid polymer electrolyte membrane to form an anode and a cathode;

a pure water feeding means directly fed into the degassing module for continuously or intermittently feeding the degassed pure water into the solid polymer electrolyte electrolytic cell; and a dehumidifying means for individually humidifying oxygen produced at the anode and hydrogen produced at the cathode of the solid polymer electrolyte electrolytic cell, wherein the dehumidifying means includes a plurality of molecular sieves connected in parallel.

* * * * *

UNITED STATES PATENT AND TRADEMARK OFFICE
CERTIFICATE OF CORRECTION

PATENT NO. : 5,484,512

DATED : January 16, 1996

INVENTOR(S) : TAKASHI SASAKI ET AL.

It is certified that error appears in the above-identified patent and that said Letters Patent is hereby corrected as shown below:

Column 6, last line, "$(Na_{12}[(AlO_2)_{12}(SiO_2)_{12}]27H_2O)$" should be --$(Na_{12}[(AlO_2)_{12}(SiO_2)_{12}]\cdot 27H_2O)$--

Signed and Sealed this

Ninth Day of April, 1996

Attest:

BRUCE LEHMAN

Attesting Officer

Commissioner of Patents and Trademarks